US006977612B1

(12) United States Patent
Bennett

(10) Patent No.: US 6,977,612 B1
(45) Date of Patent: Dec. 20, 2005

(54) SYSTEM AND METHOD FOR WIRELESS ASSET TRACKING

(75) Inventor: Michael D. Bennett, Clarkston, MI (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 10/879,711

(22) Filed: Jun. 29, 2004

(51) Int. Cl.[7] ............................ G01S 5/02; H04B 7/185
(52) U.S. Cl. ............................ 342/357.07; 342/357.09
(58) Field of Search .................. 342/357.01, 357.06, 342/357.07, 357.09, 457; 701/207, 213

(56) References Cited

U.S. PATENT DOCUMENTS

| | | | |
|---|---|---|---|
| 4,818,998 | A | 4/1989 | Apsell et al. |
| 4,908,629 | A | 3/1990 | Apsell et al. |
| 5,917,423 | A | 6/1999 | Duvall |
| 6,405,125 | B1 * | 6/2002 | Ayed ........................... 701/200 |
| 6,542,076 | B1 | 4/2003 | Joao |
| 6,618,593 | B1 | 9/2003 | Drutman et al. |
| 6,665,613 | B2 | 12/2003 | Duvall |
| 6,738,697 | B2 | 5/2004 | Breed |
| 6,768,450 | B1 * | 7/2004 | Walters et al. ......... 342/357.09 |
| 6,804,578 | B1 | 10/2004 | Ghaffari |
| 2002/0089434 | A1 * | 7/2002 | Ghazarian ................... 340/988 |
| 2003/0057270 | A1 * | 3/2003 | Collen ......................... 235/375 |
| 2004/0142678 | A1 * | 7/2004 | Krasner ..................... 455/404.2 |

OTHER PUBLICATIONS

Lionel M. Ni et al., "LANDMARC: Indoor Location Sensing Using Active RFID".
Tim Harrington, V.P. Product Strategy, WhereNet, "RTLS Real Time Locating Systems, A Newly Standardized Technology for Automotive Applications".
"Qualcomm CDMA Technologies", pp. 1-6.
"Motorola Introduces Ground-Breaking Miniature A-GPS Module", Sep. 10, 2003.
"LoJack Announces Anti-Terrorism Program for Trucking Companies Hauling Hazardous Materials", News Link Environmental, Jun. 16, 2004, pp. 1-4, www.caprep.com/b0604010.htm.
"LoJack-LoJack FAQ's", http://www.lojack.com/lojack-faqs/index.cfm, pp. 1-7.
NetworkFleet, "Networkcar", 2003.
"The Networkcar Service", Reynolds & Reynolds.

* cited by examiner

Primary Examiner—Dao Phan
(74) Attorney, Agent, or Firm—Richard Mysliwiec

(57) ABSTRACT

A system and method employing a combination of long-range and short-range asset location systems, preferable a GPS-based system combined with an RFID-based system. The short-range system regularly activates itself, or is remotely polled, to determine if the asset is within range of the short-range transceivers, and the long-range system is activated to determine the location of the asset when it is outside the range of the short-range transceivers. In at least some embodiments, the asset is an automobile equipped with both RFID and GPS-based transceivers.

21 Claims, 4 Drawing Sheets

SYSTEM AND METHOD FOR WIRELESS ASSET TRACKING

TECHNICAL FIELD OF THE INVENTION

The present invention is directed, in general, to systems and methods for wireless asset tracking, and, more specifically, to asset tracking systems using multiple tracking means.

BACKGROUND OF THE INVENTION

Tracking assets, physical inventory, and other objects in a large-scale enterprise is a daunting task. Traditionally, this requires a manual, physical inventory that must be regularly repeated. Further, as assets move from place to place, or out of the control of the enterprise, the conventional process requires a time-intensive paperwork trail to track the movement of the assets.

This already-daunting task is made even more difficult when the assets being tracked are physically similar, since in that case every specific serial number must be verified to conclusively identify the specific item.

Recently, for items such as shipping containers, radio-frequency identification (RFID) tags have been used to partially automate this process in a real-time location system (RTLS). In the common case, an asset with an attached RFID tag transmits a unique identifier, allowing an RFID tag reader to easily receive the transmitted ID number and thereby identify specific shipping containers.

An entirely different type of asset location is used for locating stolen vehicles. A commonly known system of this type is the "LoJack" system manufactured by the LoJack Corporation of Westwood, Ma, and described in U.S. Pat. Nos. 4,818,998, 4,908,629, 5,917,423, and 6,665,613, all of which are hereby incorporated by reference. In general terms, this type of system uses a remotely activated system to track a vehicle in motion, using transceivers installed in the target vehicle in combination with transceiver/detectors mounted on other vehicles.

Typically, a LoJack system is used to track stolen vehicles. When a target vehicle is reported stolen, its transceiver is remotely activated, and thereafter police units that are specially equipped with transceiver/detectors can detect and locate the target vehicle.

LoJack is a form of an asset location system that utilizes a special FCC-allocated radio frequency (173.075 MHz), an older technology, very high frequency (VHF) signal. The LoJack transceiver is passive until activated by police radio towers, and specially equipped police cruisers with receivers must work together to triangulate and locate the target vehicle. LoJack does not utilize GPS for location information, and is currently only available in 22 states.

Another type of long-range vehicle-tracking system uses global positioning satellites (GPS) to identify the current location of a vehicle. In this case, a GPS receiver is mounted in the vehicle to determine the vehicle location, and a separate transmitter is used to send the location data to the person or entity tracking the vehicle. In the common "OnStar" system, cellular telephone technology is used to activate the GPS receiver and to transmit the location data to the OnStar service center.

There is, therefore, a need in the art for a system and process that allows tracking of vehicles and other assets on both a long-range and short-range basis.

SUMMARY OF THE INVENTION

The preferred embodiment includes a system and method employing a combination of long-range and short-range asset location systems, preferably a GPS-based system combined with an RFID-based system. The short-range system regularly activates itself, or is remotely polled, to determine if the asset is within range of the short-range transceivers, and the long-range system is activated to determine the location of the asset when it is outside the range of the short-range transceivers. In at least some embodiments, the asset is an automobile equipped with both RFID and GPS-based transceivers.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment includes a system and method employing a combination of long-range and short-range asset location systems, preferable a GPS-based system combined with an RFID-based system. The short-range system regularly activates itself, or is remotely polled, to determine if the asset is within range of the short-range transceivers, and the long-range system is activated to determine the location of the asset when it is outside the range of the short-range transceivers. In at least some embodiments, the asset is an automobile equipped with both RFID and GPS-based transceivers.

The following detailed description will be specifically drawn to automotive-based applications, but the skilled artisan will recognize that the claimed embodiments are not limited to automotive applications, but can be used in any number of asset tracking systems.

A preferred embodiment uses multiple wireless technologies (RTLS/GPS) in single tag to facilitate vehicle tracking and locating, and is particularly advantageous in such areas as manufacturing plants, during delivery to dealers (trains, trucks, bailment lots, etc.), and dealer lots.

In a preferred embodiment, the real-time location system (RTLS) does not require line-of-sight (indoor/outdoor), but utilizes RF or RFID tags. Preferably, these tags conform to the ANSI 371/INCITS 371 standards, known to those of skill in the art, including transponder tag, antennae, and transceiver with decoder. This type of system is typically capable of XY location accuracy within 3–300 meters. Of course, more readers enable greater accuracy).

In some embodiments, the initial RF tag is attached to vehicle during beginning of assembly. Later, RF tag is integrated into the GPS system on vehicle. In this way, the vehicle is trackable throughout plant grounds (indoor and outdoor), and the system facilitates finding vehicles (plant lots, proving grounds, etc.) to fix quality and other issues. Preferably, a handheld PDA can be used to locate vehicles. The same RTLS infrastructure can be used for yard management, wireless part calls, container management, gate management, etc.

The RTLS RFID tags can be programmed to emit a signal every several hours, as selected by the operator, and when in the presence of a reader would update the database with the vehicle's location.

Figure 1:
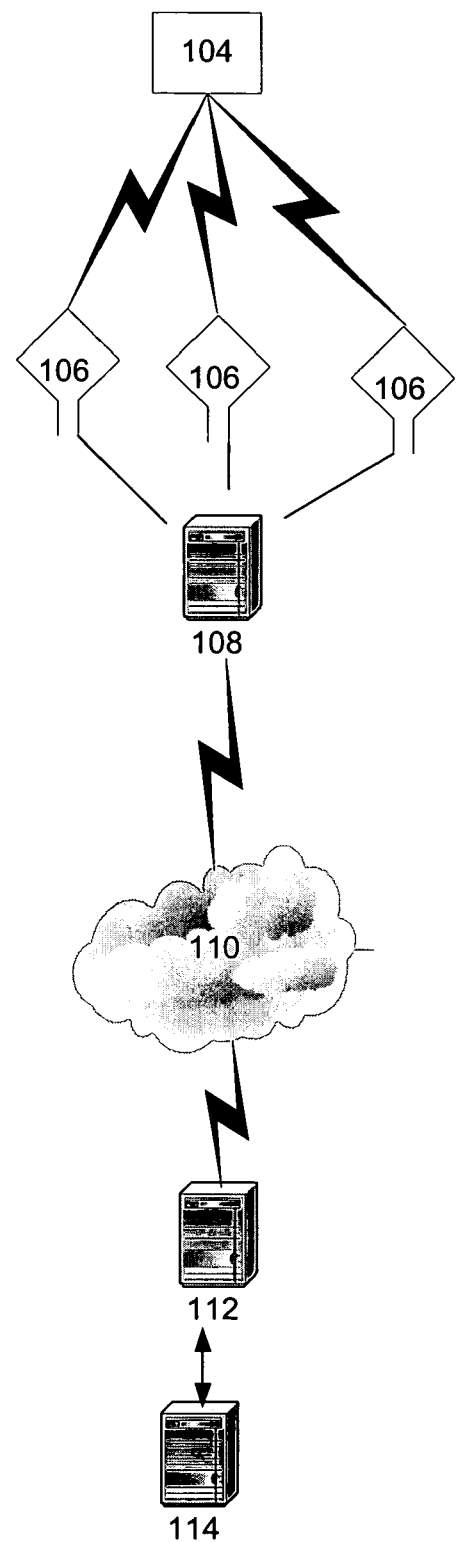
FIG. 1 depicts a block diagram of an RTLS system in accordance with a preferred embodiment.

FIG. 1 depicts a block diagram of an RTLS system in accordance with a preferred embodiment. In this figure, an identifier tag, preferably an RFID/RTLS tag, is installed in vehicle 104. This tag communicates with antennas 106, which are in turn connected to communicate with location application server 108. While three representative antennas 106 are shown, a typical installation will include many antennas, so that an RTLS tag can be located anywhere within the covered property. The tags can be set to broadcast a vehicle identification number, or other asset identifier, at set intervals (e.g., every 10 minutes, every hour, etc.)

Location application server 108 includes software having a triangulation algorithm, as known to those of skill in the art, for locating the vehicle 104 within the area served by antennas 106. Location application server 108 communicates over network 110, which can be the Internet or another public or private network, with central location server 112. Typically, there will also be one or more firewalls, not shown, through which the communications are made. Location information is preferably encrypted and secure at all times during transmission and storage. Central location server 112 includes a database that stores the last known location of each vehicle.

External system 114 is connected to communicate with central location server 112, so that the vehicle location information can be used for any appropriate purpose.

Also according to a preferred embodiment, a Global Positioning System (GPS) compliant system is installed in the vehicle. GPS is a US Govt. Satellite system used to triangulate location, and typically requires line-of-sight to satellites, necessitating outdoor use. Assisted GPS utilizes cellular network to reduce GPS search time to seconds vs. minutes. Special software, known to those of skill in the art, is required for both transponder and transceiver/decoder. The GPS system is typically capable of XY Locate accuracy within 5–30 meters.

Figure 2:
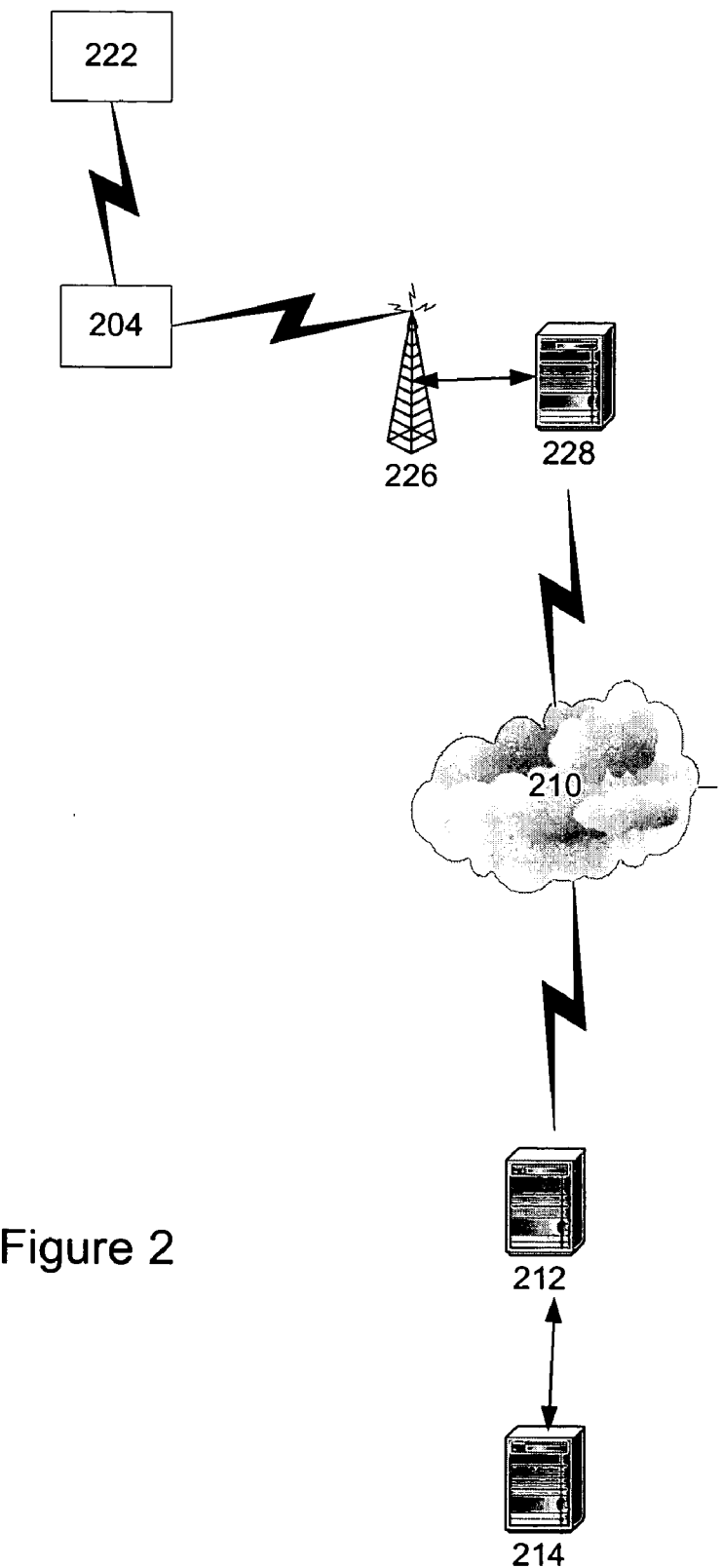
FIG. 2 depicts a block diagram of a GPS-based system in accordance with a preferred embodiment.

FIG. 2 depicts a block diagram of a GPS-based system in accordance with a preferred embodiment. In this figure, a GPS receiver and transceiver unit, typically a cellular-telephone-based transceiver is installed in vehicle 204. The GPS receiver receives location data from satellites 222, and can thereby determine its current location.

The transceiver communicates with a local base station 226, by which the location information is transmitted to location application server 228. As is known in GPS-based systems, the transceiver can be remotely activated, using base station 226, and the current location information can be polled from the GPS receiver.

Location application server 228 communicates over network 210, which can be the Internet or another public or private network, with central location server 212. Typically, there will also be one or more firewalls, not shown, through which the communications are made. Location information is preferably encrypted and secure at all times during transmission and storage. Central location server 212 includes a database that stores the last known location of each vehicle.

External system 214 is connected to communicate with central location server 212, so that the vehicle location information can be used for any appropriate purpose.

In the GPS-based system, vehicle location polling can be done similarly to what is currently in production at "OnStar"-type systems today. Unsold vehicles or other vehicles for which up-to-date location information is needed can be polled when their last known location is a selected number of hours old. Vehicle location polling can be tied to vehicle event status (build, delivered, sold, etc.)

Figure 3:
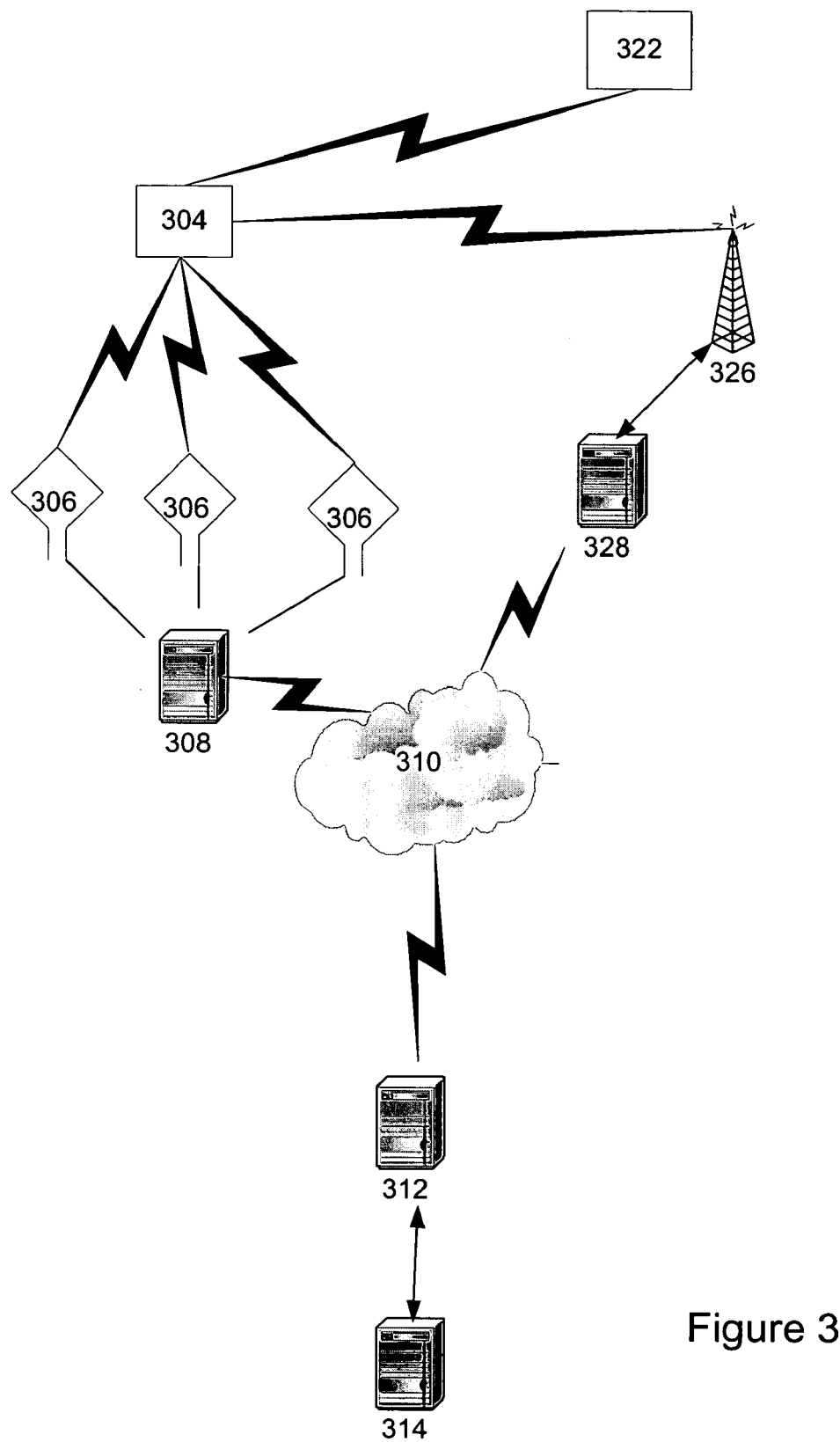
FIG. 3 depicts a block diagram of a combined system, in accordance with a preferred embodiment, including both RFID and GPS-based location systems.

FIG. 3 depicts a block diagram of a combined system, in accordance with a preferred embodiment, including both RTLS/RFID and GPS-based location systems.

In this figure, a GPS receiver and transceiver unit, typically a cellular-telephone-based transceiver is installed in vehicle 304. The GPS receiver receives location data from satellites 322, and can thereby determine its current location.

The transceiver communicates with a local base station 326, by which the location information is transmitted to location application server 328. As is known in GPS-based systems, the transceiver can be remotely activated, using base station 326, and the current location information can be polled from the GPS receiver.

Location application server 328 communicates over network 310, which can be the Internet or another public or private network, with central location server 312. Typically, there will also be one or more firewalls, not shown, through which the communications are made. Location information is preferably encrypted and secure at all times during transmission and storage. Central location server 212 includes a database that stores the last known location of each vehicle.

An identifier tag, preferably an RFID/RTLS tag, is installed also in vehicle 304. This tag communicates with antennas 306, which are in turn connected to communicate with location application server 308. While three representative antennas 306 are shown, a typical installation will include many antennas, so that an RTLS tag can be located anywhere within the covered property. The tags can be set to broadcast a vehicle identification number, or other asset identifier, at set intervals (e.g., every 30 minutes, every hour, etc.)

Location application server 308 includes software having a triangulation algorithm, as known to those of skill in the art, for locating the vehicle 304 within the area served by antennas 306. Location application server 308 communicates over network 310, which can be the Internet or another public or private network, with central location server 312. Typically, there will also be one or more firewalls, not shown, through which the communications are made. Location information is preferably encrypted and secure at all times during transmission and storage.

External system 314 is connected to communicate with central location server 312, so that the vehicle location information can be used for any appropriate purpose.

In the GPS-based system, vehicle location polling can be done similarly to what is currently in production at "OnStar"-type systems today. Unsold vehicles or other vehicles for which up-to-date location information is needed can be polled when their last known location is a selected number of hours old. Vehicle location polling can be tied to vehicle event status (build, delivered, sold, etc.)

The combination system allows vehicles to be tracked in transit from the assembly plant to their end destination via GPS. Vehicles can then be tracked by GPS on a national scale, or by RF once they reach suitably-equipped locations, such as dealer locations, rail yards, bailment lots, etc.

Figure 4:
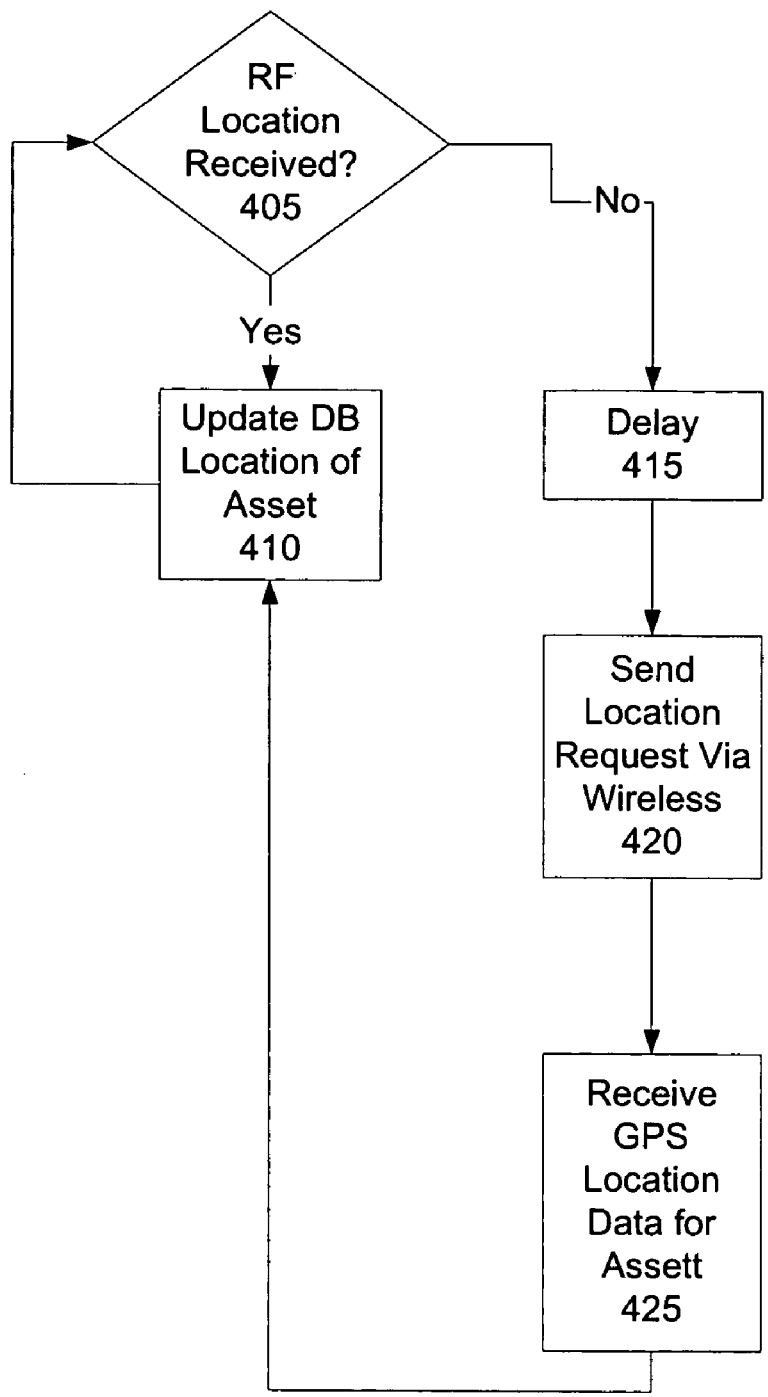
FIG. 4 depicts a flowchart of a process in accordance with the preferred embodiment.

FIG. 4 depicts a flowchart of a process in accordance with the preferred embodiment. Here, the central location server will periodically receive updates of the location of an asset, generated by an automatic signal sent by the RTLS tag of the asset. In this case as above, the asset is preferably but not necessarily a vehicle. When the RF-generated location information is received (step 405), the asset location database is updated to reflect the current location of the asset (step 410).

If no RF-generated location information is received (step 405) after a predetermined delay (step 415), which is typically between one hour and one day, the central location server will generate a location request, which is transmitted over the network to be delivered to the asset over a wireless network, typically a wireless telephone network (step 420).

The asset will receive the request, determine its current location based on the GPS system, and respond via the wireless network. The central location server will receive the GPS-based location information (step 425). When the GPS-based location information is received, the asset location database is updated to reflect the current location of the asset (step 410).

Some specific advantages of a system as described and claimed include tying GPS and RTLS together to allow for "smart" connections utilizing the lower cost medium when available. The tag can augment and leverage GPS systems such as "OnStar." RTLS can later be expanded to locate parts, racks, assemblies, etc. at assembly plants and/or test facilities.

In some embodiments, an Active RFID tag is used as the RFID tag. An active RFID can be re-written many times. Utilization of an active RFID tag in a vehicle would allow it to broadcast various vehicle telematics data. For example, the vehicle may have a "service engine soon" light coming on. The applicable trouble code is stored in the vehicle's On-board Diagnostic system and written to the RFID tag. The trouble code can then be broadcast, so that when the driver pulls into a dealer service bay, the code can be received by an RFID reader and pre-populate the service writer's screen with the relevant data (VIN, trouble code, mileage, etc.). In essence, the above would do away with the need for dealer's to plug a computer into the OBD system on the car to pull the trouble code.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for locating a physical object, comprising:
   detecting if localized location information corresponding to the physical object has been received, the localized location information corresponding to a location determined from a signal received from a short-range transmitter;

if the localized location information has been received, then storing the localized location information;

if no localized location information has been received for a predetermined amount of time, then sending a location request;

receiving secondary location information corresponding to the physical object, the secondary location information corresponding to a location determined from global positioning satellites; and storing the secondary location information.

2. The method of claim 1, wherein the localized location information is determined by a real-time location system.

3. The method of claim 1, wherein the short-range transmitter is an RFID transmitter.

4. The method of claim 1, wherein the location request is sent over a wide-area wireless network.

5. The method of claim 1, wherein the secondary location information is received over a wide-area wireless network.

6. The method of claim 1, wherein the predetermined amount of time is one day.

7. The method of claim 1, wherein the physical object is a vehicle.

8. The method of claim 1, wherein the physical object has both an RFID transmitted and a GPS receiver.

9. A computer program product tangibly embodied in a machine-readable medium, comprising:

instructions for detecting if localized location information corresponding to the physical object has been received, the localized location information corresponding to a location determined from a signal received from a short-range transmitter;

instructions for, if the localized location information has been received, then storing the localized location information;

instructions for, if no localized location information has been received for a predetermined amount of time, then sending a location request;

receiving secondary location information corresponding to the physical object, the secondary location information corresponding to a location determined from global positioning satellites; and storing the secondary location information.

10. The computer program product of claim 9, wherein the localized location information is determined by a real-time location system.

11. The computer program product of claim 9, wherein the short-range transmitter is an RFID transmitter.

12. The computer program product of claim 9, wherein the location request is sent over a wide-area wireless network.

13. The computer program product of claim 9, wherein the secondary location information is received over a wide-area wireless network.

14. The computer program product of claim 9, wherein the predetermined amount of time is one day.

15. The computer program product of claim 9, wherein the physical object is a vehicle.

16. The computer program product of claim 9, wherein the physical object has both an RFID transmitted and a GPS receiver.

17. An asset location system, comprising:

means for detecting if localized location information corresponding to the physical object has been received, the localized location information corresponding to a location determined from a signal received from a short-range transmitter;

means for, if the localized location information has been received, then storing the localized location information;

means for, if no localized location information has been received for a predetermined amount of time, then sending a location request;

receiving secondary location information corresponding to the physical object, the secondary location information corresponding to a location determined from global positioning satellites; and storing the secondary location information.

18. The system of claim 17, further comprising a real-time location system configured to receive a signal from the short-range transmitter and thereby determine the location of the physical object.

19. The system of claim 17, further comprising means for transmitting the location request over a wireless telephone network.

20. The system of claim 17, further comprising means for receiving the secondary location information over a wireless telephone network.

21. The system of claim 17, wherein the short-range transmitter is an RFID transmitter.

* * * * *